United States Patent
Yamanaka et al.

(10) Patent No.: US 7,247,111 B2
(45) Date of Patent: Jul. 24, 2007

(54) VEHICLE STEERING APPARATUS

(75) Inventors: Kosuke Yamanaka, Kashiwara (JP); Shiro Nakano, Minamikawachi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 225 days.

(21) Appl. No.: 11/205,246

(22) Filed: Aug. 16, 2005

(65) Prior Publication Data

US 2005/0288142 A1    Dec. 29, 2005

Related U.S. Application Data

(63) Continuation of application No. PCT/JP2005/009974, filed on May 31, 2005.

(30) Foreign Application Priority Data

May 31, 2004    (JP)    ............... 2004-162324

(51) Int. Cl.
*F16H 3/72*    (2006.01)
(52) U.S. Cl. .......................................... 475/2
(58) Field of Classification Search .............. 475/2, 475/3, 4; 180/410, 412, 431, 443
See application file for complete search history.

(56) References Cited

U.S. PATENT DOCUMENTS 7,063,636 B2 *    6/2006    Augustine .................. 475/3
2004/0171453 A1    9/2004    Bock et al.

FOREIGN PATENT DOCUMENTS

| DE | 102 14 655 | 10/2003 |
|---|---|---|
| EP | 1 394 013 | 3/2004 |
| JP | 64-6177 | 1/1989 |
| WO | WO-02/103221 | 12/2002 |

* cited by examiner

Primary Examiner—Dirk Wright
(74) Attorney, Agent, or Firm—Jordan and Hamburg LLP

(57) ABSTRACT

A vehicle steering apparatus comprises a rotation transmission mechanism 4 which connects a first shaft 3 connected to an operating member 2 with a second shaft 5 connected to vehicle wheels 9 so as to enable the rotation to be transmitted. An actuator 61 rotatably drives one of a plurality of rotation transmission elements in the rotation transmission mechanism 4. The control device 65 has a steady control mode in which the actuator 61 is controlled such that the rotation speed of one of the rotation transmission elements becomes equal to the determined rotation speed of the first shaft 3. The rotation transmission ratio becomes 1 when the rotation speed of one of the rotation transmission elements becomes equal to the rotation speed of the first shaft 3.

2 Claims, 14 Drawing Sheets

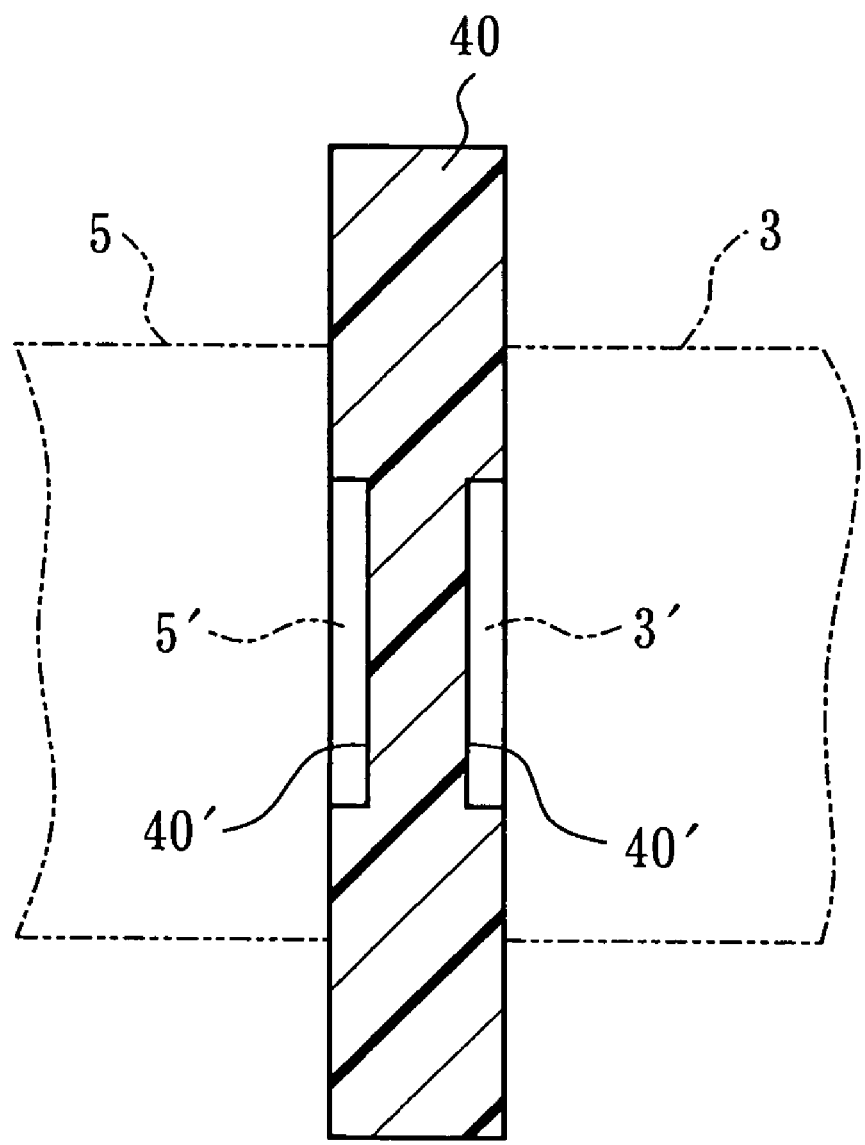

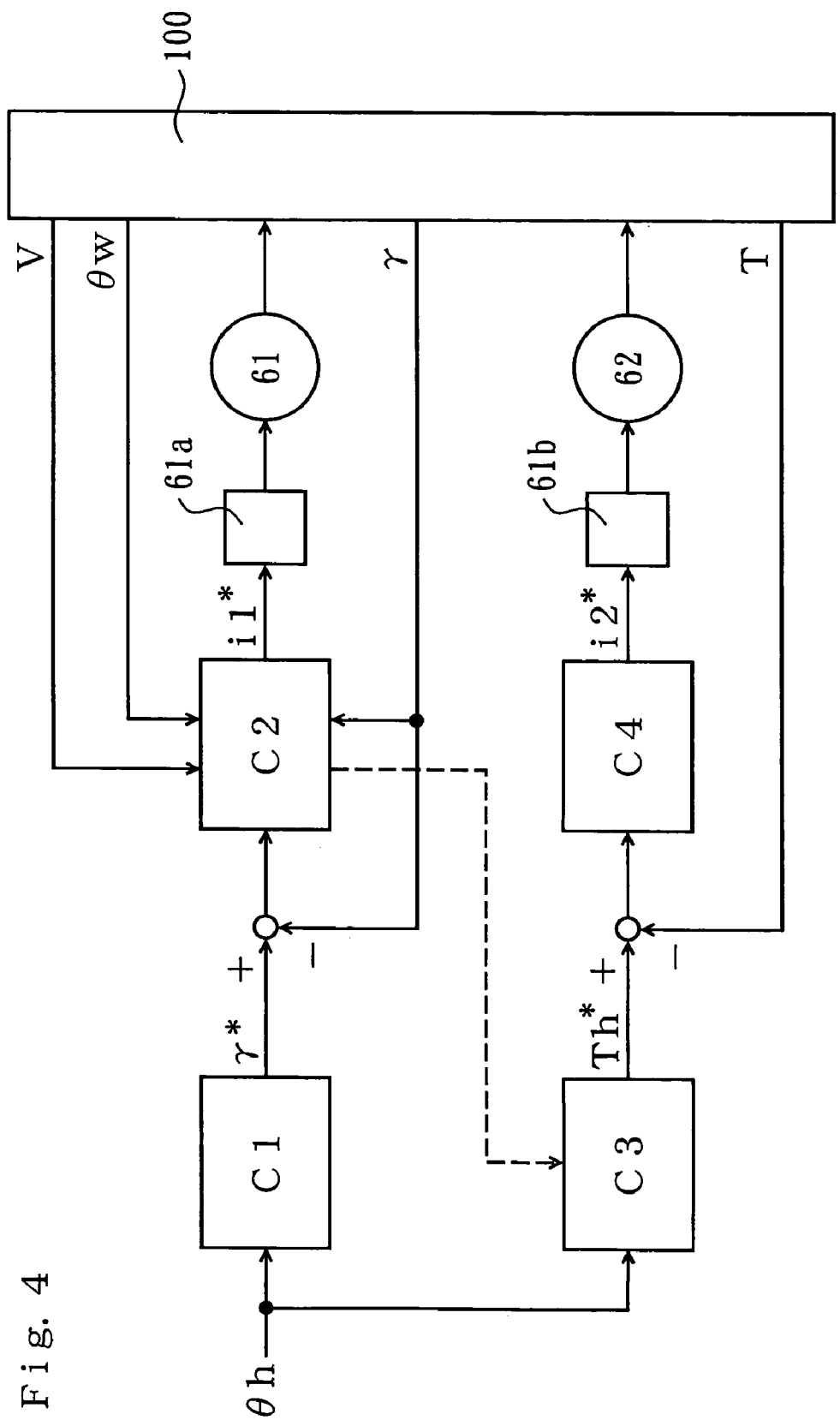

VEHICLE STEERING APPARATUS

TECHNICAL FIELD

The present invention relates to a vehicle steering apparatus.

BACKGROUND ART

Conventionally, known is a vehicle steering apparatus comprising a first shaft connected to an operating member; a second shaft connected to vehicle wheels so as to change the setting angle according to the rotation thereof; a rotation transmission mechanism having rotation transmission elements which connect the first shaft with the second shaft so as to enable the rotation to be transmitted and enable the rotation transmission ratio to be changed based on the change of the rotation speed; and an actuator for changing the rotation transmission ratio by changing the rotation speed of the rotation transmission elements (c.f. specification of German Patent Application Publication No. 10214655).

This rotation transmission mechanism has a first sun gear, a second sun gear disposed coaxially and facing with the first sun gear, a first planetary gear which engages with the first sun gear and has an axis parallel with the first sun gear, a second planetary gear which engages with the second sun gear and rotates together with the first planetary gear coaxially, and a carrier for rotatably supporting both sun gears and both planetary gears around their respective axes as the rotation transmission elements.

The rotation transmission ratio between the first shaft and second shaft is changed by changing the rotation speed of the carrier by means of the actuator, with connecting the first shaft to the first sun gear and connecting the second shaft to the second sun gear. The ratio between the amount of operation of the operating member and the steering angle of the vehicle wheel can be changed by changing the rotation transmission ratio between the first shaft and second shaft.

DISCLOSURE OF THE INVENTION

Problem to be Solved by the Invention

According to the foregoing conventional vehicle steering apparatus, active steering which changes the steering angle regardless of the driver's intention is enabled based on the control of the actuator. For example, as the active steering, the steering angle is changed in a direction opposite to the operating direction of the operating member so as to stabilize the vehicle attitude when the vehicle is oversteered, or the amount of change in the steering angle of the vehicle wheels based on the operation of the operating member is increased when the vehicle is traveling at slow speed.

When the active steering is not performed, a steady state is realized wherein the rotation transmission ratio between the first shaft and second shaft is kept at a steady value. In order to realize such steady state, it may be considered to stop the actuator and fix the carrier. However, when the carrier is fixed, the status of engagement between the first sun gear and first planetary gear and the status of engagement between the second sun gear and second planetary gear change when the operating member is operated, and the transmission torque fluctuates. When this torque fluctuation is transmitted to the driver, there is a problem that the driving feeing deteriorates. Thus, an object of the present invention is to provide a vehicle steering apparatus capable of overcoming the foregoing problems.

Means for Solving the Problem

The vehicle steering apparatus of the present invention comprises a first shaft connected to an operating member; a second shaft connected to vehicle wheels such that the steering angle changes according to the rotation thereof; a rotation transmission mechanism for connecting the first shaft with the second shaft via a plurality of rotation transmission elements so as to enable the rotation to be transmitted and enable the rotation transmission ratio between the first shaft and the second shaft to be changed; an actuator for rotatably driving one of the rotation transmission elements; a rotation speed determination part for determining the rotation speed of the first shaft; and a control device having a steady control mode in which the actuator is controlled so that the rotation speed of one of the rotation transmission elements becomes equal to the determined rotation speed of the first shaft; wherein the rotation transmission ratio becomes 1 when the rotation speed of one of the rotation transmission elements becomes equal to the rotation speed of the first shaft.

According to the present invention, by making the rotation speed of one of the rotation transmission elements in the rotation transmission mechanism equal to the rotation speed of the first shaft in the steady control mode, the rotation transmission ratio based on the rotation transmission mechanism becomes 1. Thereby, each of the rotation transmission elements rotates together with each other in the steady control mode so as not to change in the engagement with each other, so that the fluctuations in the torque transmitted to the driver can be prevented.

Preferably, the rotation transmission mechanism has a first sun gear which rotates together with the first shaft coaxially, a second sun gear which rotates together with the second shaft coaxially and is disposed coaxially with the first sun gear, a first planetary gear which engages with the first sun gear and has an axis parallel to the first sun gear, a second planetary gear which engages with the second sun gear and rotates together with the first planetary gear coaxially, and a carrier for rotatably supporting both the sun gears and both the planetary gears around their respective axes as the rotation transmission elements, wherein the rotation speed of the carrier becomes equal to the rotation speed of the first shaft in the steady control mode. Thereby, all rotation transmission elements rotate together coaxially in the steady control mode, and the operating torque can be smoothly transmitted as if the first shaft is directly connected with the second shaft.

According to the present invention, in a vehicle steering apparatus capable of active steering which changes the steering angle of the vehicle wheels regardless of the driver's intention, a good steering feeling can be obtained even when such active steering is not being performed.

BRIEF DESCRIPTION OF THE DRAWINGS

FIG. 3B is a cross section of the friction member in the rotation transmission mechanism according to the embodiment of the present invention.

FIG. 4 is a block diagram representing the control function of the control device in the vehicle steering apparatus according to the embodiment of the present invention.

BEST MODE FOR CARRYING OUT THE INVENTION

Figure 1:
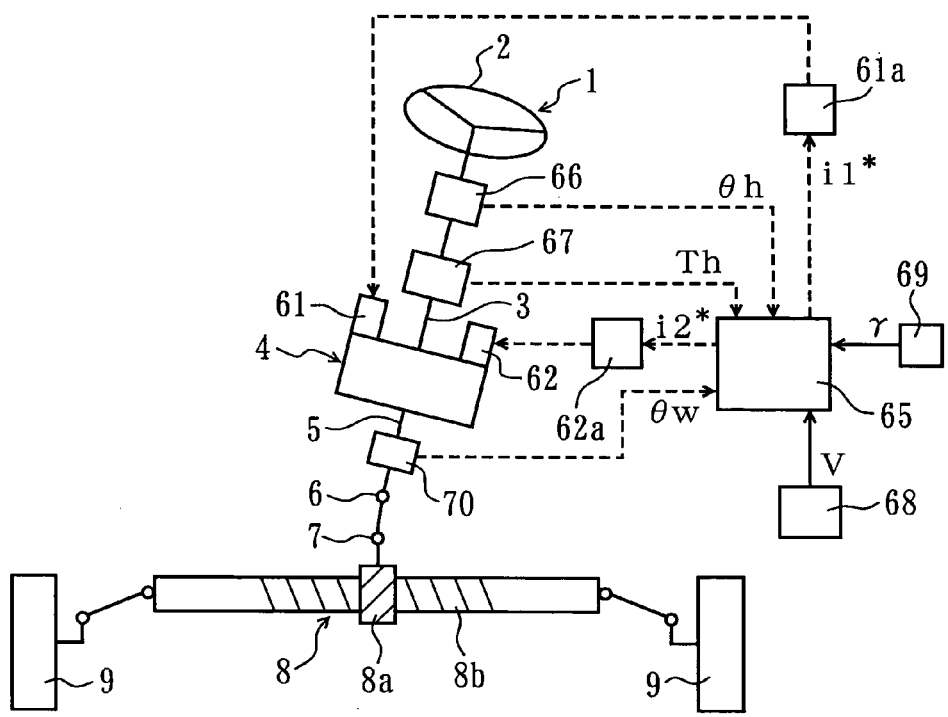
FIG. 1 is a diagram for explaining the configuration of the vehicle steering apparatus according to an embodiment of the present invention.

The vehicle steering apparatus 1 shown in FIG. 1 comprising a first shaft 3 connected to a steering wheel 2 (operating member) transmits the rotation of the first shaft 3, which rotates by the operation of the steering wheel 2, to a second shaft 5 via a rotation transmission mechanism 4, and transmits the rotation of the second shaft 5 to vehicle wheels 9 via a steering gear 8 from universal couplings 6, 7 so as to change the steering angle. There is no particular limitation on the configuration of the steering gear 8, as long as it connects the second shaft 5 with the vehicle wheels 9 so that the steering angle changes according to the rotation thereof. In the present embodiment, the movement of a rack 8b engaging with a pinion 8a, which rotates by the rotation of the second shaft 5, is transmitted to the vehicle wheels 9 via linkages.

Figure 2:
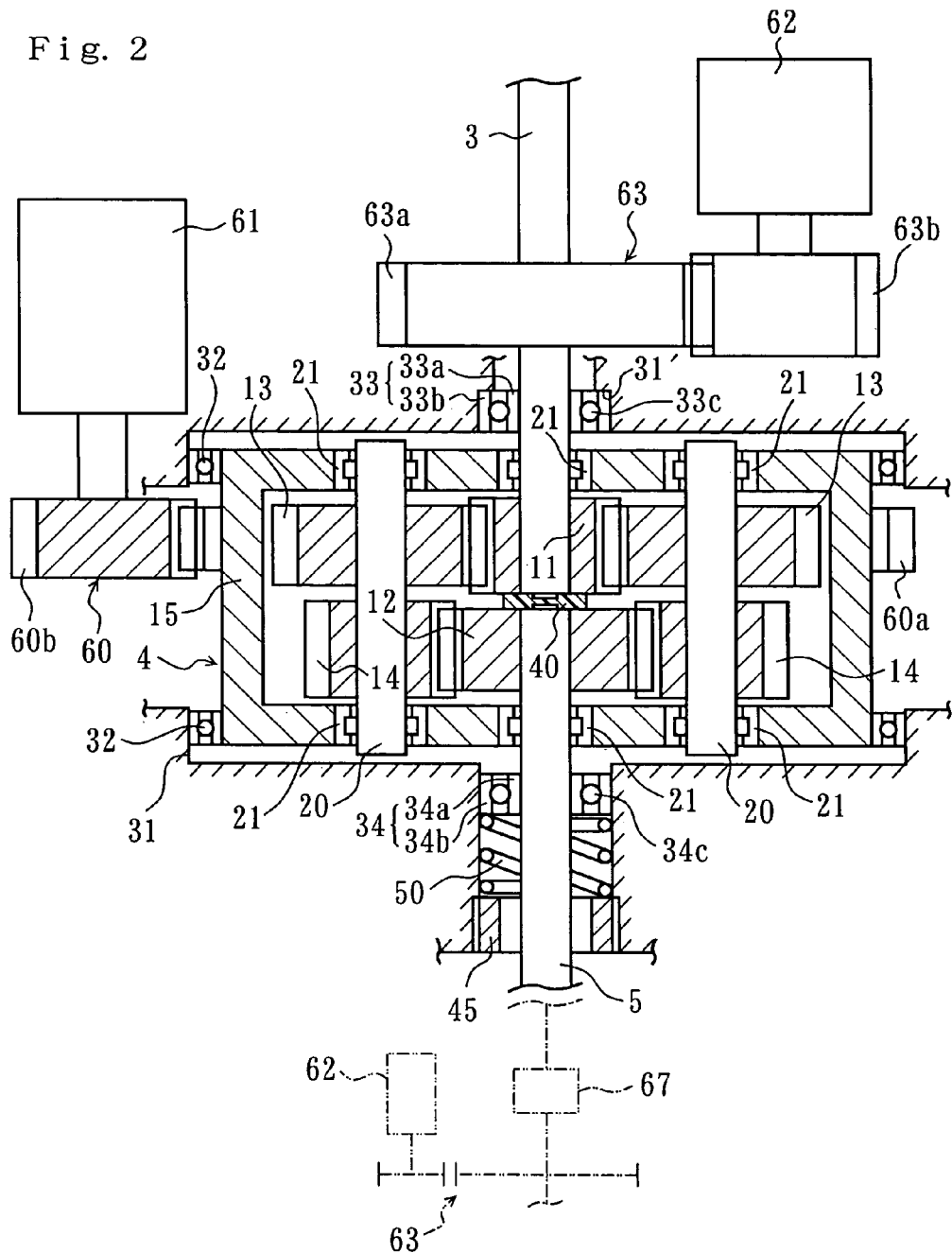
FIG. 2 is a cross section of the rotation transmission mechanism according to the embodiment of the present invention.

The rotation transmission mechanism 4 connects the first shaft 3 with the second shaft 5 so as to enable the rotation to be transmitted. As shown in FIG. 2, the rotation transmission mechanism 4 has a first sun gear 11, a second sun gear 12, a pair of first planetary gears 13, a pair of second planetary gears 14, and a carrier 15 as a plurality of rotation transmission elements. The first shaft 3 is integrated with the first sun gear 11 by, for example, being press fitted therein, and therefore rotates together with the first sun gear 11 coaxially and moves in the axial direction together with the first sun gear 11. The second shaft 5 is integrated with the second sun gear 12 by, for example, being press fitted therein, and therefore rotates together with the second sun gear 12 coaxially and moves in the axial direction together with the second sun gear 12.

The first sun gear 11 and second sun gear 12 face to each other and are disposed coaxially. Each of the first planetary gears 13 engages with the first sun gear 11 and has an axis parallel to the first sun gear 11, and is disposed 180 degrees apart from each other in the peripheral direction of the first sun gear 11. Each of the second planetary gears 14 engages with the second sun gear 12, and is disposed 180 degrees apart from each other in the peripheral direction of the second sun gear 12. One of the first planetary gears 13 and one of the second planetary gears 14 rotate together coaxially, and the other of the first planetary gears 13 and the other of the second planetary gears 14 rotate together coaxially. In the present embodiment, the first planetary gear 13 and the second planetary gear 14, which rotate together coaxially, are integrated by, for example, press fitting a connector shaft 20 thereinto. By supporting the first shaft 3, second shaft 5 and connector shaft 20 via bearings 21, the carrier 15 rotatably supports both sun gears 11, 12 and both planetary gears 13, 14 around their respective axes.

The rotation transmission mechanism 4 has a support member 31 that supports the carrier 15 so that the carrier 15 can rotate relative to both sun gears 11, 12 coaxially. The support member 31 is preferably configured from a housing that covers the sun gears 11, 12, planetary gears 13, 14, and carrier 15 and fixed to the vehicle body. In the present embodiment, the support member 31 supports the carrier 15 via bearings 32.

Figure 3A:
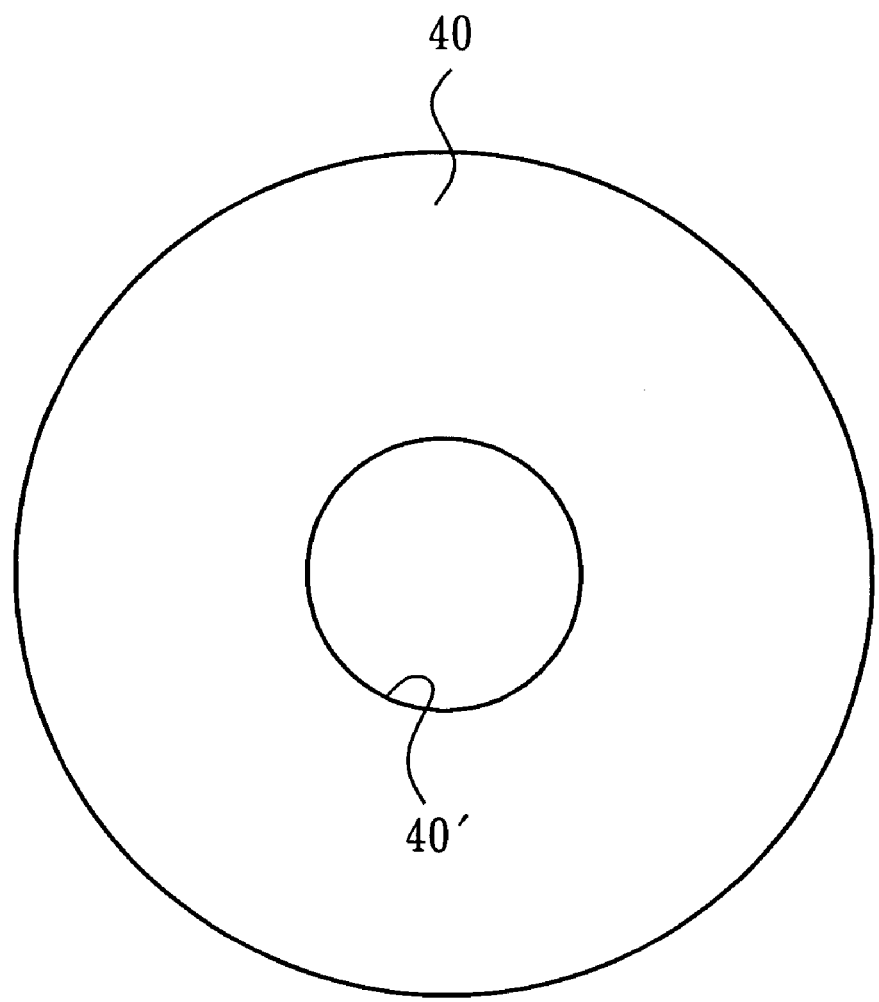
FIG. 3A is a front view of the friction member in the rotation transmission mechanism according to the embodiment of the present invention.

A friction member 40 is disposed between the first sun gear 11 and the second sun gear 12. The friction member 40, for instance, as shown in FIG. 3A and FIG. 3B, is constituted from a discoid resin sheet, and its fall from between both sun gears 11, 12 is prevented by fitting the convex portions 3', 5' protruding from the end faces of the first shaft 3 and the second shaft 5 into the concave portions 40' formed at the center of both sides thereof.

The first shaft 3 is rotatably supported by a first ball bearing 33 around its axis. The first ball bearing 33 is supported by a portion of the support member 31 covering the first shaft 3. The second shaft 5 is rotatably supported by a second ball bearing 34 around its axis. The second ball bearing 34 is supported by a portion of the support member 31 covering the second shaft 5.

The inner ring 33a of the first ball bearing 33 is able to move together with the first shaft 3 in the axial direction by, for example, press fitting the first shaft 3 into the inner ring 33a. The outer ring 33b of the first ball bearing 33 is prevented from moving in the direction away from the second ball bearing 34, with its outer periphery being supported by the support member 31 relatively movably in the axial direction and its one end being received by a step portion 31' of the support member 31.

The inner ring 34a of the second ball bearing 34 is able to move together with the second shaft 5 in the axial direction by, for example, press fitting the second shaft 5 into the inner ring 34a. The outer ring 34b of the second ball bearing 34 is allowed to move in the direction toward the first ball bearing 33, with its outer periphery being supported by the support member 31 relatively movably in the axial direction.

A compression spring 50 (elastic member) is sandwiched between the outer ring 34b of the second ball bearing 34 and a cylindrical screw member 45 screwed to the portion supporting the second shaft. Thereby, the spring 50 exerts the elastic fore on the outer ring 34b of the second ball bearing 34 toward the first ball bearing 33 along the axial direction. As a result, the elastic force makes the first sun gear 11 and the second sun gear 12 approach to each other, and the friction member 40 is sandwiched between both sun gears 11, 12 based on the elastic force. Thus, frictional force acting in the direction of suppressing the relative rotation between the friction member 40 and the respective sun gears 11, 12 is provided. Further, the elastic force of the spring 50 makes the outer ring 33b of the first ball bearing 33 and the outer ring 34b of the second ball bearing 34 approach to each other.

The rotation transmission mechanism 4 connects the first shaft 3 with the second shaft 5 via a plurality of rotation transmission elements so as to enable the rotation transmission ratio between the first and second shafts 3, 5 to be changed. A first actuator 61 is connected to the carrier 15 via a deceleration gear mechanism 60. The deceleration gear mechanism 60 has a first gear 60a formed integrally with the outer periphery of the carrier 15, and a second gear 60b that engages with the first gear 60a, and an output shaft of a first actuator 61 is connected to the second gear 60b. The first actuator 61 can be configured from, for instance, a known electric motor. The carrier 15 is rotatably driven by the first actuator 61.

A second actuator 62 is connected to the first shaft 3 via a deceleration gear mechanism 63. The deceleration gear mechanism 63 has a first gear 63a formed integrally with the outer periphery of the first shaft 3, and a second gear 63b that engages with the first gear 63a, and an output shaft of a second actuator 62 is connected to the second gear 63b. The second actuator 62 can be configured from, for instance, a known electric motor. The second actuator 62 generates additional torque for changing the operating torque of the steering wheel 2, without changing the rotation transmission ratio between the first shaft 3 and second shaft 5 by the rotation transmission mechanism 4.

As shown in FIG. 1, the first actuator 61 and second actuator 62 are connected to the control device 65 via drive circuits 61a, 62a. An operating angle sensor 66 for detecting the rotation angle of the first shaft 3 as a value corresponding to the operating angle $\theta h$ which is amount of operation from the straight-ahead position of the steering wheel 2, a torque sensor 67 for detecting the torque transmitted by the first shaft 3 as a value corresponding to the operating torque Th of the steering wheel 2, a vehicle speed sensor 68 for detecting the vehicle speed V, a yaw rate sensor 69 for detecting the yaw rate $\gamma$ of the vehicle, and a steering angle sensor 70 for detecting the rotation angle of the second shaft 5 as a value corresponding to the steering angle $\theta w$ are connected to the control device 65. The operating angle $\theta h$, operating torque Th, yaw rate $\gamma$ and steering angle $\theta w$ are treated as positive when facing toward one of the left and right of the vehicle, and treated as negative when facing toward the other direction. Incidentally, as a modified example, as shown with the chain double dashed line in FIG. 2, the second actuator 62 can be connected to the second shaft 5 via the deceleration gear mechanism 63, and the torque sensor 67 can be used to detect the torque transmitted by the second shaft 5 as a value corresponding to the operating torque Th.

FIG. 4 is a block diagram representing the control function of the control device 65 for the first actuator 61 and the second actuator 62. In FIG. 4, the computing part C1 in the control device 65 computes the target yaw rate $\gamma^*$ from the relationship of $\gamma^* = G1 \cdot \theta h$ stored in the control device 65 and the operating angle $\theta h$ detected with the operating angle sensor 66. G1 is a transfer function of the target yaw rate $\gamma^*$ relative to the operating angle $\theta h$ of the steering wheel 2, and there is no particular limitation as long as it is able to properly control the vehicle attitude. For example, when performing first-order lag control, it is set as $G1 = K1/(1+t1 \cdot s)$ with s as the Laplace operator, K1 as the steady gain of the target yaw rate $\gamma^*$ relative to the operating angle $\theta h$, t1 as the first-order lag time constant of the target yaw rate $\gamma^*$ relative to the operating angle $\theta h$, and the gain K1 and the time constant t1 are suitably adjusted to enable optimum control.

The computing part C2 in the control device 65 functions as a judgment part for judging the necessity of changing the rotation transmission ratio between the first shaft 3 and the second shaft 5 from a steady preset value by the rotation transmission mechanism 4, a target value determination part for determining the target drive current i1* of the first actuator 61 corresponding to the target value of the rotation transmission ratio according to a predetermined rule, and a rotation speed determination part for determining the rotation speed of the first shaft 3.

To be more precise, the steady preset value is predetermined and stored in the control device 65, and made to be 1. The necessity of changing the rotation transmission ratio from the steady preset value is judged according to a predetermined judgment standard. This judgment standard, in the present embodiment, is whether the vehicle 100 is being oversteered or not. For example, in a case where $\theta w \cdot (\gamma^* - \gamma)$ is computed from the detected steering angle $\theta w$, yaw rate $\gamma$ and the determined target yaw rate $\gamma^*$ and this $\theta w \cdot (\gamma^* - \gamma)$ is negative, the vehicle 100 is being oversteered because the detected yaw rate $\gamma$ is exceeding the target yaw rate $\gamma^*$, and therefore it is judged that it is necessary to change the rotation transmission ratio from the steady preset value to stabilize the vehicle attitude.

When it is judged that it is not necessary to change the rotation transmission ratio from the steady preset value, the target drive current i1* of the first actuator 61 is set to value io corresponding to 1, which is the steady preset value of the rotation transmission ratio. Here, the control device 65 determines the rotation speed of the first shaft 3 from the rotation angle of the first shaft 3 detected by the operating angle sensor 66 in a time series, and determines the drive current io of the first actuator 61 necessary to make the rotation speed of the carrier 15 become equal to the determined rotation speed of the first shaft 3. Thereby, the control device 65 has a steady control mode in which the first actuator 61 is controlled so that the rotation speed of the carrier 15 becomes equal to the determined rotation speed of the first shaft 3.

When it is judged that it is necessary to change the rotation transmission ratio from the steady preset value, in the present embodiment, the target drive current i1* of the first actuator 61 is set so as to eliminate the oversteered state. For example, the target drive current i1* is computed from the relationship of $i1^* = F(\gamma^*, \gamma)$ stored in the control device 65 and the yaw rate $\gamma$ detected by the yaw rate sensor 69. $F(\gamma^*, \gamma)$ is the function of the target yaw rate $\gamma^*$ and the detected yaw rate $\gamma$, and the steering angle $\theta w$ is predetermined according to the deviation $(\gamma^* - \gamma)$ determined by subtracting the yaw rate $\gamma$ from the target yaw rate $\gamma^*$ so as to change toward the direction opposite to the operating direction of the steering wheel 2.

The drive circuit 61a of the first actuator 61 performs, for example, PWM control so that the drive current of the first actuator 61 becomes the target drive current i1*, and functions as a drive part for driving the first actuator 61 so that the rotation transmission ratio between the first shaft 3 and the second shaft 5 becomes a proper value.

The computing part C3 in the control device 65 determines the target operating torque Th* relative to the operating angle θh of the steering wheel 2 according to a predetermined rule.

To be more precise, in the present embodiment, until it is judged that it is necessary to change the rotation transmission ratio from the steady preset value, the target operating torque Th* is set so as to coincide with the operating torque Th detected at the time when the additional torque added by the second actuator 62 is zero. When the additional torque added by the second actuator 62 is zero, the operating torque Th changes in correlation with the amount of operation from the straight-ahead position of the steering wheel 2 because it corresponds to the friction resistance between the road surface and the vehicle wheels 9.

Further, from the time when it is judged that it is necessary to change the rotation transmission ratio from the steady preset value until the time when it is judged that it is no longer necessary, the target operating torque Th* is determined from the relationship of Th*=Kh·θh with Kh as the torque control standard ratio so as to be changed in correlation with the amount of operation from the straight-ahead position of the steering wheel 2 in the present embodiment. Here, the ratio of the detected operating torque Th relative to the detected operating angle θh of the steering wheel 2 at the time when it is judged that it is necessary to change the rotation transmission ratio from the steady preset value is determined as the torque control standard ratio Kh, and so the computing part C3 also functions as the standard ratio determination part.

Figure 5:
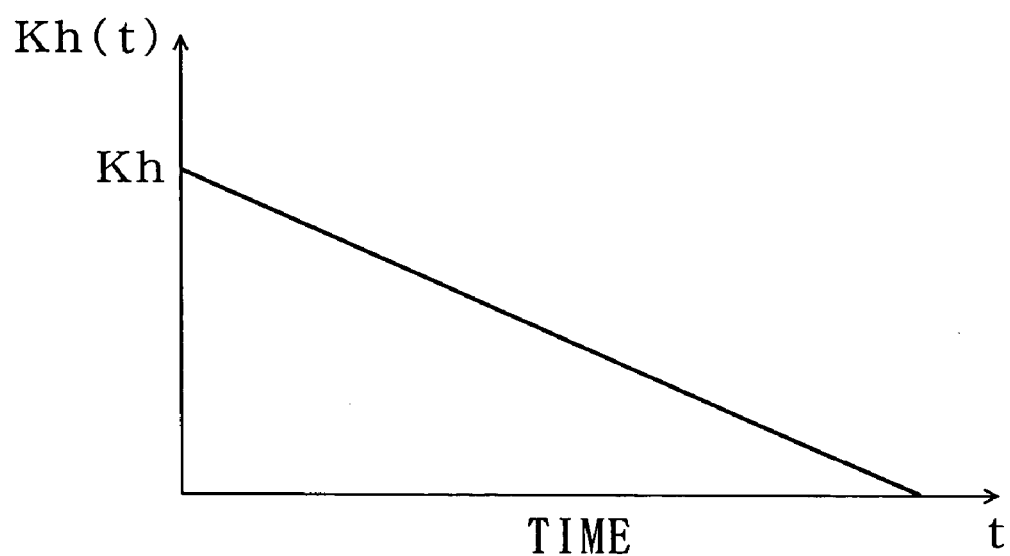
FIG. 5 is a diagram showing the relationship between the control ratio of the additional torque relative to the operating angle and the time, when it is judged that it is no longer necessary to change the rotation transmission ratio by the rotation transmission mechanism according to the embodiment of the present invention from the steady preset value after judged that it is necessary.

From the time when it is judged that it is no longer necessary to change the rotation transmission ratio from the steady preset value after it is judged that it is necessary, the target drive current i1* of the first actuator 61 corresponding to the target value of the rotation transmission ratio is set to a value corresponding to the steady preset value, and the target value of the additional torque gradually changes until it becomes the base value of zero. To be more precise, in the present embodiment, the target operating torque Th* is determined from the relationship of Th*=Th+Kh(t)·θh with Kh(t) as the control ratio, so that the additional torque gradually decreases to zero from the time when it is judged it is no longer necessary to change the rotation transmission ratio from the steady preset value after it is judged that it is necessary. The control ratio Kh(t) is a function of time, and as shown in FIG. 5, set so as to gradually decrease from the torque control standard ratio Kh to zero pursuant to progress of time.

The computing part C4 in the control device 65 functions as a target value determination part for determining the target drive current i2* of the second actuator 62 corresponding to the target value of the additional torque according to a predetermined rule.

To be more precise, in the present embodiment, until it is judged that it is necessary to change the rotation transmission ratio from the steady preset value, the target drive current i2* of the second actuator 62 corresponding to the target value of the additional torque is set to a base value so that the operating angle θh changes in correlation with the amount of operation from the straight-ahead position of the steering wheel 2. In the present embodiment, since the additional torque added by the second actuator 62 is zero until it is judged that it is necessary to change the rotation transmission ratio from the steady preset value as mentioned above, the target drive current i2* is set to zero as the base value.

From the time when it is judged that it is necessary to change the rotation transmission ratio from the steady preset value, the target value of the additional torque is changed from the base value so that the operating torque Th is changed in correlation with the amount of operation from the straight-ahead position of the steering wheel 2, regardless of the change of the rotation transmission ratio from the steady preset value. To be more precise, when it is judged that it is necessary to change the rotation transmission ratio from the steady preset value as described above, since the target operating torque Th* is determined from the relationship of Th*=Kh·θh, the target drive current i2* is set to a function of the deviation (Th*−Th) determined by subtracting the detection operating torque Th from the target operating torque Th*. For instance, the target drive current i2* is computed from the relationship of i2*=G2·(Th*−Th) stored in the control device 65 and the operating torque Th detected with the torque sensor 67. G2 is the transfer function of the target drive current i2* relative to the torque deviation (Th*−Th), for example, G2=K2[1+1/(τa·s)] with K2 as the gain, s as the Laplace operator and τa as the time constant when performing PI control. The gain K2 and time constant τa are suitably adjusted to enable optimum control. Thereby, from the time when it is judged that it is necessary to change the rotation transmission ratio from the steady preset value, the target drive current i2* of the additional torque is changed from the base value of zero so that the target operating torque Th* determined by multiplying the torque control standard ratio Kh with the detected operating angle θh of the steering wheel 2 is exerted.

The drive circuit 62a for the second actuator 62 performs, for example, PWM control so that the drive current of the second actuator 62 becomes the target drive current i2*, and so it functions as a drive part for driving the second actuator 62 such that the additional torque becomes the target value.

Figure 6:
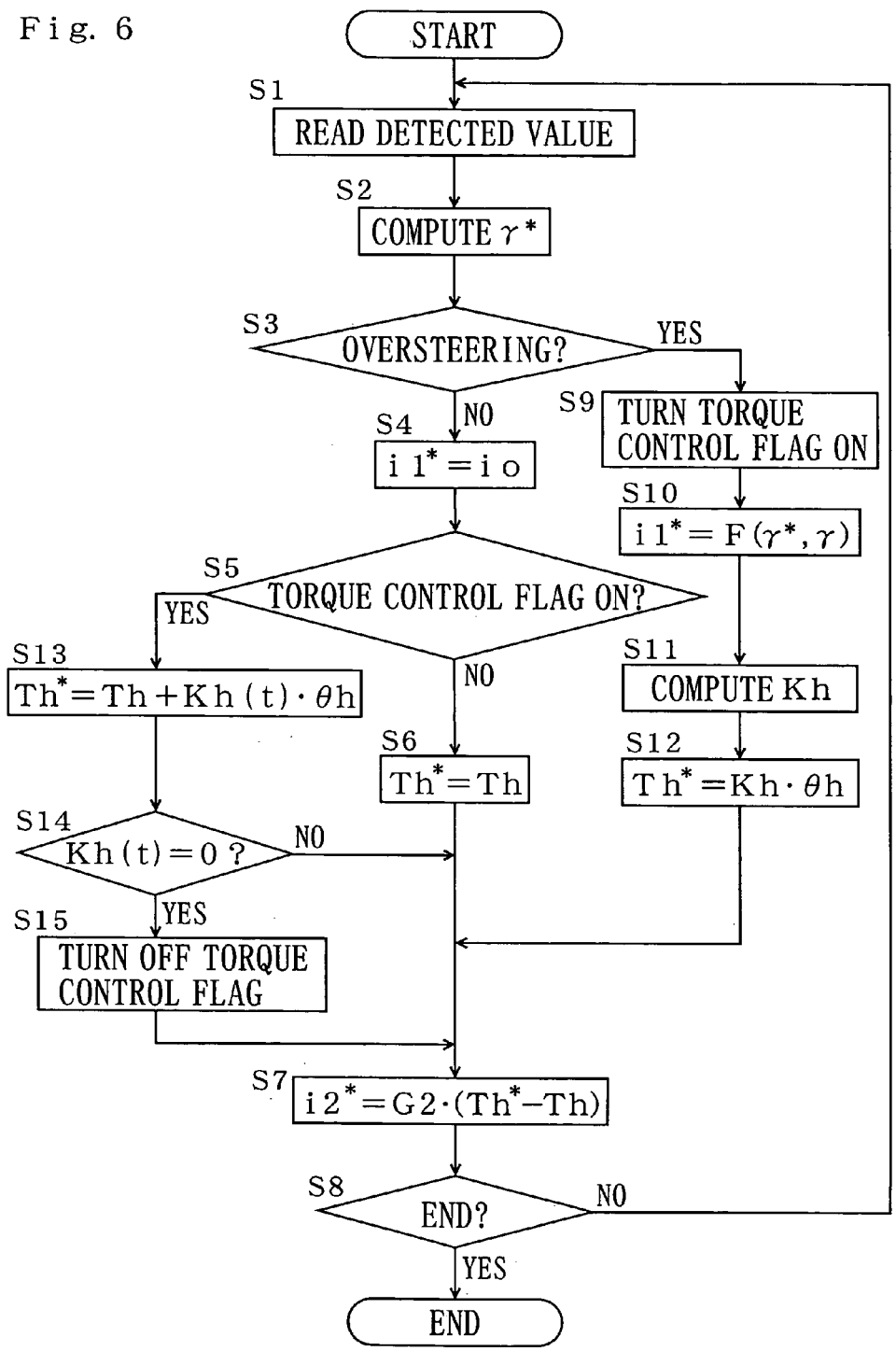
FIG. 6 is a flowchart showing the control procedures of the control device in the vehicle steering apparatus according to the embodiment of the present invention.

The control process of the first actuator 61 and second actuator 62 with the control device 65 is explained with reference to the flowchart of FIG. 6.

Firstly, the values of the operating angle θh, operating torque Th, vehicle speed V, yaw rate γ and steering angle θw detected by the respective sensors 66 to 70 are read (step S1). Next, the target yaw rate γ* corresponding to the detected operating angle θh is determined (step S2), and it is judged whether the vehicle 100 is in an oversteered state or not (step S3). If the vehicle 100 is not in an oversteered state, the target drive current i1* of the first actuator 61 is set to the value io corresponding to the steady preset value of 1 of the rotation transmission ratio (step S4) to control the first actuator 61. Here, the rotation transmission ratio is set to 1 by making the rotation speed of the carrier 15 be equal to the rotation speed of the first shaft 3. Next, it is judged whether the torque control flag is turned on or not (step S5), if this is not turned on, the target operating torque Th* is set to the detected operating torque Th (step S6), and the target drive current i2* of the second actuator 62 is determined from the relationship of i2*=G2·(Th*−Th) and the detected operating torque Th (step S7) to control the second actuator 62. Here, since i2* becomes zero, the second actuator 62 is not driven, and the additional torque is zero. Next, it is judged whether the control is to be ended or not by, for example, whether the ignition switch is on or off (step S8), the routine returns to step S1 when the control is not to be ended. At step S3, if the vehicle 100 is in an oversteered state, the torque control flag is turned on (step S9), and the target drive current i1* of the first actuator 61 is determined from the relationship of i1*=F(γ*, γ) and the detected yaw rate γ (step S10) to control the first actuator 61. Further, the torque control standard ratio Kh is computed from the detected operating angle θh and detected operating torque Th at the time when it is judged that it is necessary to change the rotation transmission ratio from the steady preset value (step S11), the target operating torque Th* is determined from the relationship of Th*=Kh·θh, the torque control standard ratio Kh and detected operating angle θh (step S12), and the target drive current i2* of the second actuator 62 is determined at step S7 to control the second actuator 62. At step S5, if the torque control flag is turned on, the target operating torque Th* is determined from the relationship of Th*=Th+Kh(t)·θh, the detected operating torque and detected operating angle (step S13), it is judged whether the control ratio Kh(t) reached zero or not (step S14), the torque control flag is turned off when it has reached zero (step S15), and the routine proceeds to step S7 without turning off the torque control flag if it has not reached zero.

Figure 7:
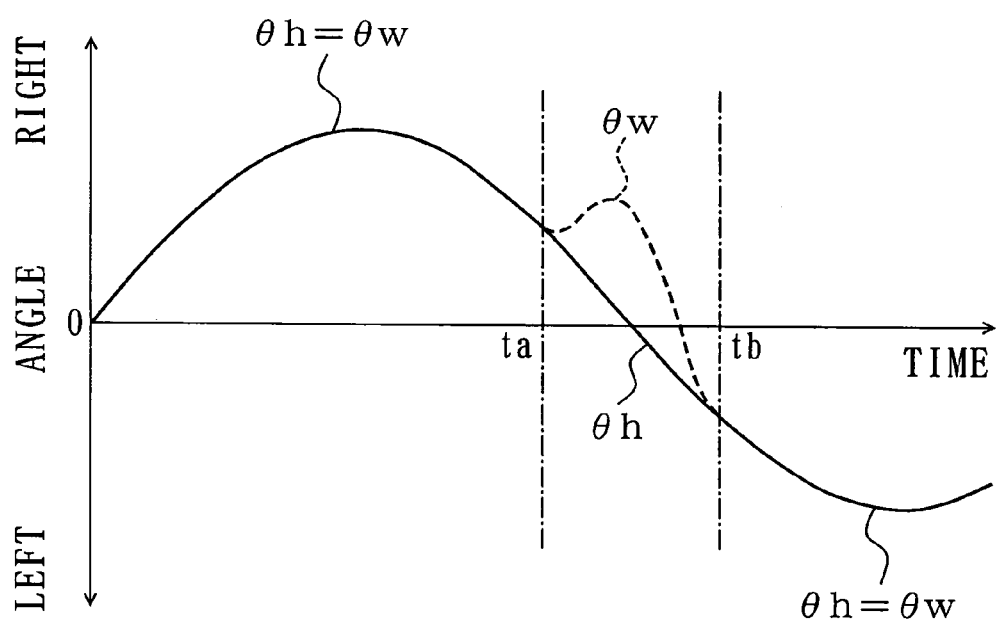
FIG. 7 is a diagram showing an example of the relationship between the operating angle, steering angle and time in the vehicle steering apparatus according to the embodiment of the present invention.

FIG. 7 shows an example of the relationship between the operating angle θh corresponding to the rotation angle of the first shaft 3, the steering angle θw corresponding to the rotation angle of the second shaft 5, and time in a case where the steering wheel 2 is reciprocally operated to the left and right at a given quantity and at a fixed operational speed. Let it be assumed that the rotation transmission ratio between the first shaft 3 and the second shaft 5 is judged that it is not necessary to be changed by the rotation transmission mechanism 4 from the steady preset value until the progress of time ta from the start of operation, judged that it is necessary to be changed from the steady preset value at the time ta, and judged that it is not necessary to be changed from the steady preset value again upon the progress of time tb. Until the progress of time ta, since the rotation transmission ratio is the steady preset value of 1, the operating angle θh and steering angle θw are equal. After the progress of time ta, since the rotation transmission ratio changes from the steady preset value such that the steering angle θw changes in the direction opposite to the operating direction of the steering wheel 2, the steering angle θw differs from the operating angle θh as shown with the dotted line. After the progress of time tb, since the rotation transmission ratio again becomes the steady preset value of 1, the operating angle θh and steering angle θw are equal.

Figure 8:
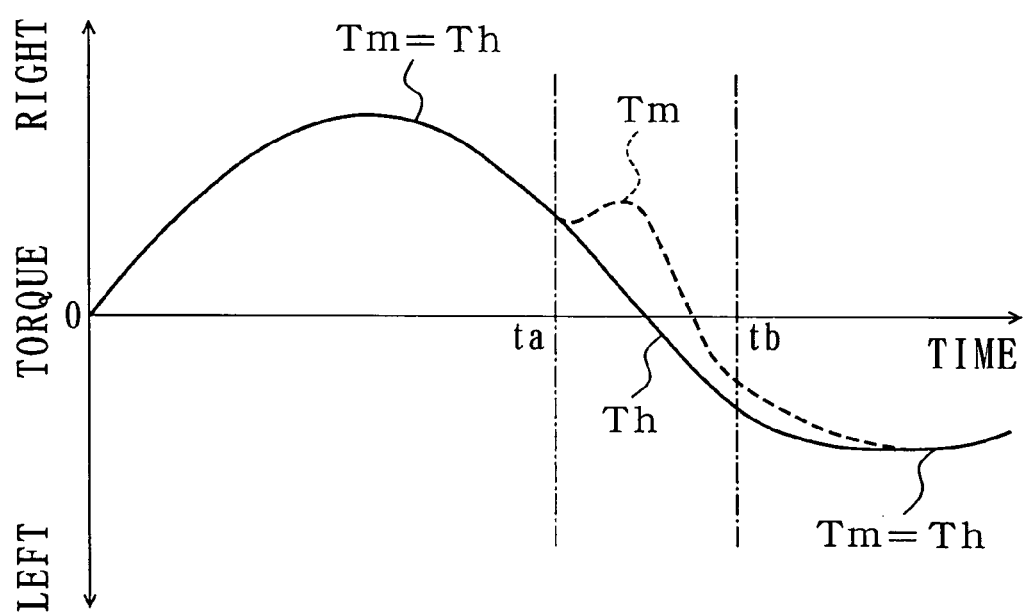
FIG. 8 is a diagram showing an example of the relationship between the operating torque, steering torque and time in the vehicle steering apparatus according to the embodiment of the present invention.

FIG. 8 shows an example of the relationship between the operating torque Th transmitted by the first shaft 3, steering torque Tm transmitted by the second shaft 5 corresponding to the friction between the road surface and vehicle wheels 9, and time in a case where the steering wheel 2 is reciprocally operated to the left and right at a given quantity and at a fixed operational speed as shown in FIG. 7. Until the progress of time ta, since the additional torque added by the second actuator 62 is zero, the operating torque Th and steering torque Tm are equal and change in correlation with the amount of operation from the straight-ahead position of the steering wheel 2. After the progress of time ta, since the rotation transmission, ratio changes from the steady preset value of 1 so that the steering angle θw changes in a direction opposite to the operating direction of the steering wheel 2, the steering torque Tm changes according to the change of the steering angle θw as shown with the dotted line in FIG. 8. Meanwhile, regardless of the change of the rotation transmission ratio from the steady preset value, the operating torque Th changes in correlation with the amount of operation from the straight-ahead position of the steering wheel 2 by changing the target value of the additional torque added by the second actuator 62 from the base value. After the progress of time tb, since the rotation transmission ratio changes to the steady preset value of 1 and the additional torque added by the second actuator 62 gradually changes to zero, the operating torque Th changes in correlation with the amount of operation from the straight-ahead position of the steering wheel 2, and the operating torque Th and steering torque Tm become equal when the additional torque added by the second actuator 62 becomes zero.

As a result, when it is not necessary to change the rotation transmission ratio between the first shaft 3 and the second shaft 5 from the steady preset value by the rotation transmission mechanism 4, the first actuator 61 is controlled such that the rotation transmission ratio becomes the steady preset value of 1. Further, by setting the target value of the additional torque to the base value of zero, the operating torque Th changes in correlation with the operating angle θh from the straight-ahead position of the steering wheel 2. When it is necessary to change the rotation transmission ratio between the first shaft 3 and the second shaft 5 from the steady preset value, the first actuator 61 is controlled such that the rotation transmission ratio changes from the steady preset value and becomes a target value. Further, by changing the target value of the additional torque from the base value, the second actuator 62 is controlled so that the operating torque Th changes in correlation with the operating angle θh from the straight-ahead position of the steering wheel 2. In other words, not only at the time when the rotation transmission ratio is a steady preset value but also at the time when it is changed from the steady preset value, the operating torque Th can be changed in correlation with the operating angle θh from the straight-ahead position of the steering wheel 2. In the present embodiment, when the rotation transmission ratio between the first shaft 3 and the second shaft 5 is the steady preset value, the torque corresponding to the friction between the vehicle wheels 9 and the road surface is transmitted to the driver as the operating torque Th as it is, and when the active steering of changing the rotation transmission ratio by the control of the first actuator 61 is performed, a virtual operating torque Th according to the amount of operation of the steering wheel 2 is exerted to the driver. Thereby, when the rotation transmission ratio is changed based on the change of the controlled variable of the first actuator 61 such as when counter steering is required, the driver does not feel the fluctuation of torque, which is not intended by the driver, by canceling the fluctuation of the operating torque Th with the control of the second actuator 62.

Figure 9:
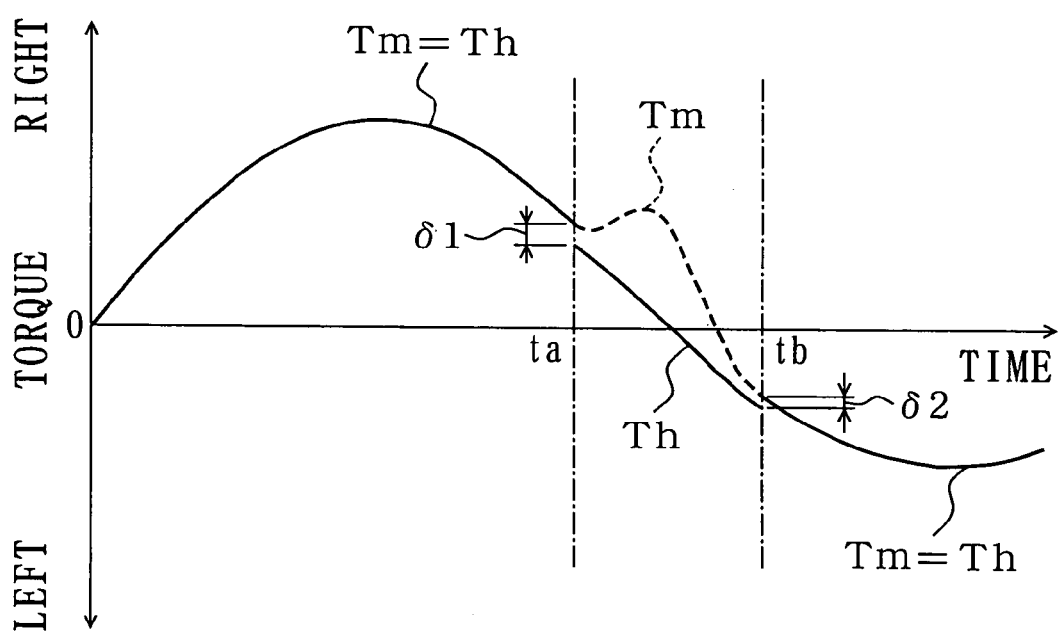
FIG. 9 is a diagram showing an example of the relationship between the operating torque, steering torque and time in the vehicle steering apparatus according to the embodiment of the present invention.

Further, when the rotation transmission ratio between the first shaft 3 and second shaft 5 is the steady preset value, the operating torque Th changes in correlation with the operating angle θh from the straight-ahead position of the steering wheel 2, and when the rotation transmission ratio changes from the steady preset value, the operating torque Th corresponds to the value determined by multiplying the torque control standard ratio Kh to the detected operating angle θh of the steering wheel 2. Since the torque control standard ratio Kh is a ratio of the detected operating torque Th relative to the detected operating angle θh of the steering wheel 2 at the time when it is judged that it is necessary to change the rotation transmission ratio from the steady preset value, the operating torque Th can be smoothly changed in correlation with the operating angle θh from the straight-ahead position of the steering wheel 2 without having to change it stepwise, when the rotation transmission ratio between the first shaft 3 and the second shaft 5 changes from the steady preset value. For example, if the ratio of the operating torque Th relative to the operating angle θh after the progress of time ta is not the torque control standard ratio Kh, a stepwise change δ1 of the operating torque Th occurs at the time ta as shown in FIG. 9 when the additional torque is generated by the second actuator 62. Meanwhile, as a result of making the ratio of the operating torque Th relative to the operating angle θh after the progress of time ta to be the torque control standard ratio Kh, the operating torque Th can be smoothly changed before and after the progress of time ta as shown in FIG. 8 when the additional torque is generated by the second actuator 62.

Further, when it is judged that it is not necessary to change the rotation transmission ratio between the first shaft 3 and the second shaft 5 from the steady preset value after it is judged that it is necessary, the operating torque Th can be smoothly changed in correlation with the amount of operation from the straight-ahead position of the steering wheel 2 without having to change it stepwise by gradually changing the additional torque to zero. For example, if the additional torque is suddenly made to zero at the time tb, though the steering torque Tm does not change suddenly due to the elasticity of the tires, a stepwise change δ2 of the operating torque Th occurs at the time tb as shown in FIG. 9 because the operating torque Th change suddenly due to the change of the rotation transmission ratio. Contrarily, by gradually changing the additional torque to zero after the progress of time tb, the operating torque Th can be changed smoothly in correlation with the amount of operation after the progress of time tb as shown in FIG. 8.

According to the foregoing embodiment, by sandwiching the friction member 40 between both sun gears 11, 12 with the elastic force of the spring 50, frictional force can be applied in the direction of suppressing the relative rotation of the friction member 40 and the respective sun gears 11, 12. Thereby, when rotation is transmitted from one of the sun gears 11, 12 via both planetary gears 13, 14 to the other of the sun gear 11, 12, frictional force in the direction of suppressing the relative rotation of both sun gears 11, 12 is exerted. In other words, by transmitting the rotation of one of the sun gears 11, 12 via both planetary gears 13, 14 to the other of the sun gear 11, 12 while effecting the force for suppressing the relative rotation of both sun gears 11, 12, the teeth of the first sun gear 11 is pressed against the teeth of the first planetary gear 13 and the teeth of the second sun gear 12 is pressed against the teeth of the second planetary gear 14 during such transmission of rotation, and so it is possible to prevent the generation of rattle between the mutually engaging teeth. Further, the outer rings 33b, 34b and inner rings 33a, 34a of the first and second ball bearings 33, 34 are pressed against rolling elements 33c, 34c by the elastic force for sandwiching the friction member 40 between both sun gears 11, 12, and so it is possible to prevent the generation of rattle in the first and second ball bearings 33, 34.

Further, according to the foregoing embodiment, the rotation transmission ratio based on the rotation transmission mechanism 4 becomes 1, by making the rotation speed of the carrier 15 in the rotation transmission mechanism 4 equal to the rotation speed of the first shaft 3 in the steady control mode. Thereby, each of the rotation transmission elements of sun gears 11, 12, planetary gears 13, 14 and carrier 15 rotates together with each other in the steady control mode so as not to change in engagement with each other, so that the fluctuations of the torque transmitted to the driver can be prevented. Moreover, all rotation transmission elements rotate together coaxially in the steady control mode, and so the operating torque can be smoothly transmitted as if the first shaft 3 is connected with the second shaft 5 directly.

There is no particular limitation on how the rotation transmission ratio changes according to the rotation speed of the carrier 15 by the rotation transmission mechanism 4. The following Table 1 shows the rotation speed of the second shaft 5, the rotation speed difference between the first shaft 3 and the carrier 15, and the rotation speed difference between the second shaft 5 and the carrier 15 in a case where the rotation speed of the carrier 15 is changed in four levels with setting the rotation speed of the first shaft 3 to 1. In Table 1, Example A shows a case where the rotation speed of the carrier 15 is made to ½ of the rotation speed of the first shaft 3, wherein the second shaft 5 is sped up relative to the first shaft 3. Example B shows a case where the rotation speed of the carrier 15 is made to equal to the rotation speed of the first shaft 3, that is, the steady control mode, wherein the first shaft 3, second shaft 5 and carrier 15 rotate together without relative rotation. Example C shows a case where the rotation speed of the carrier 15 is made to 3/2 of the rotation speed of the first shaft 3, wherein the second shaft 5 is slowed down relative to the first shaft 3. Example D shows a case where the carrier 15 is stopped, wherein the second shaft 5 is sped up relative to the first shaft 3.

TABLE 1

|  | A | B | C | D |
|---|---|---|---|---|
| First Shaft Rotation Speed | 1.0000 | 1.0000 | 1.0000 | 1.0000 |
| Second Shaft Rotation Speed | 1.6250 | 1.0000 | 0.3750 | 2.2500 |
| Carrier Rotation Speed | 0.5000 | 1.0000 | 1.5000 | 0.0000 |
| First Shaft - Carrier Rotation Speed Difference | 0.5000 | 0.0000 | −0.5000 | 1.0000 |
| Second Shaft - Carrier Rotation Speed Difference | 1.1250 | 0.0000 | −1.1250 | 2.2500 |

The present invention is not limited to the foregoing embodiments. For example, the configuration of the rotation transmission mechanism is not particularly limited as long as it is within the scope of the present invention, and the number of first planetary gears 13 and second planetary gears 14 can be one or three or more.

Figure 10:
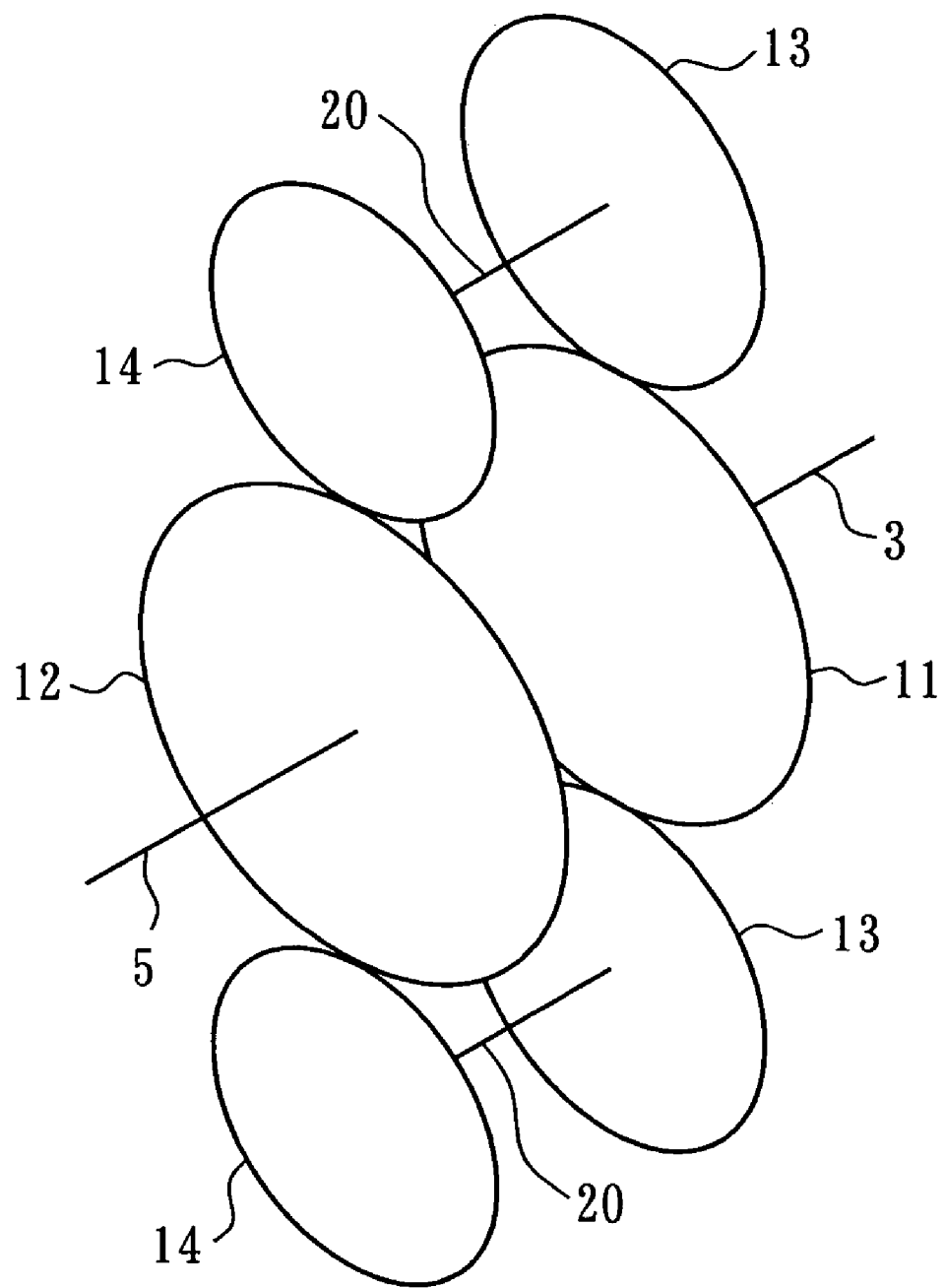
FIG. 10 is a diagram for explaining the configuration of the rotation transmission mechanism according to a first modified example of the present invention.

As shown by the rotation transmission mechanism 4 of the first modified example in FIG. 10, the number of gear teeth of the respective planetary gears 13, 14 can be less than the number of gear teeth of both sun gears 11, 12, and there is no particular limitation on the number of gear teeth of the respective sun gears 11, 12 and planetary gears 13, 14 configuring the rotation transmission mechanism 4.

Figure 11:
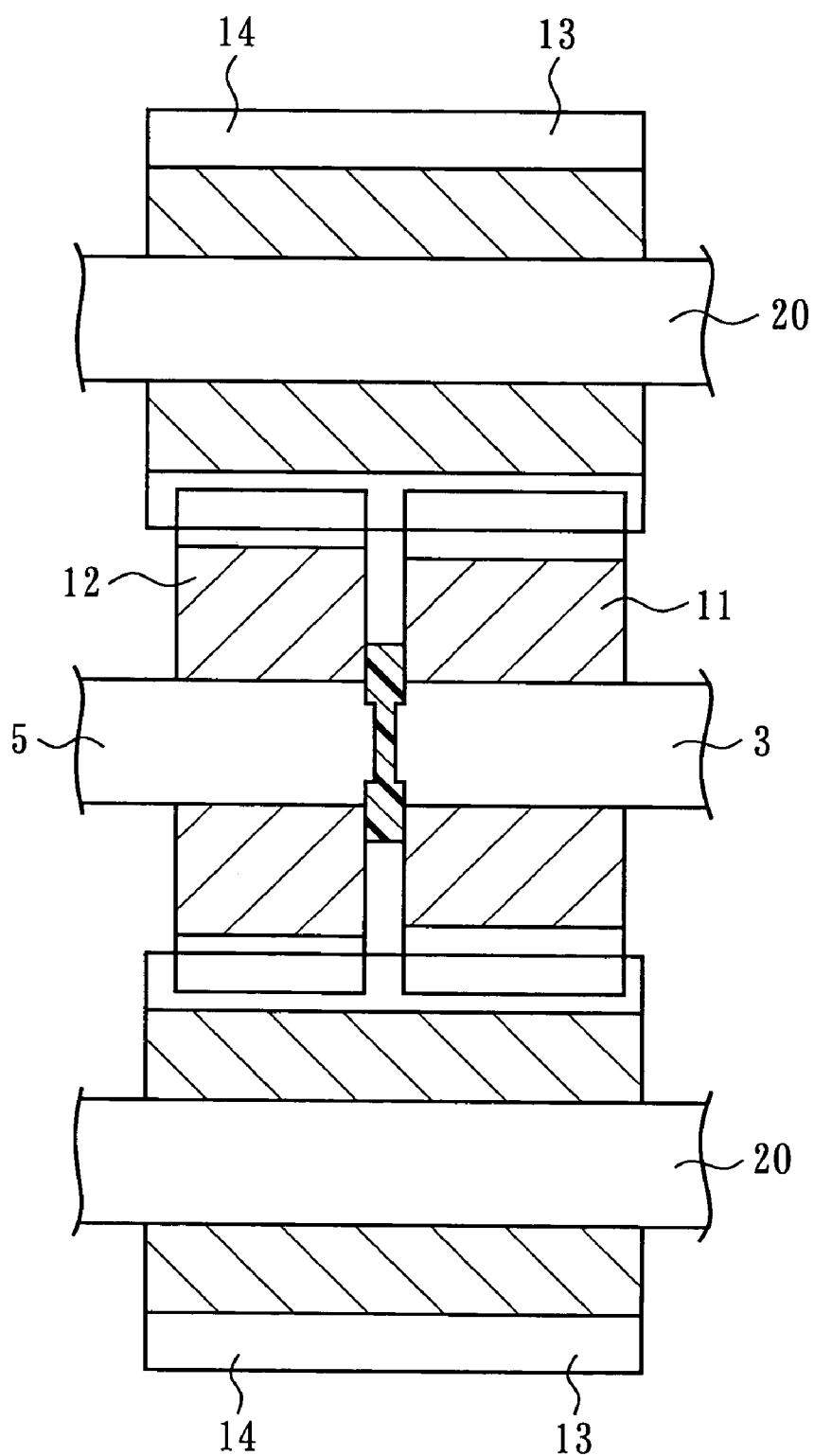
FIG. 11 is a partial cross section for explaining the configuration of the rotation transmission mechanism according to a second modified example of the present invention.

As shown by the rotation transmission mechanism 4 of the second modified example in FIG. 11, the first planetary gear 13 and the second planetary gear 14 can be formed integrally from the same material.

Figure 12:
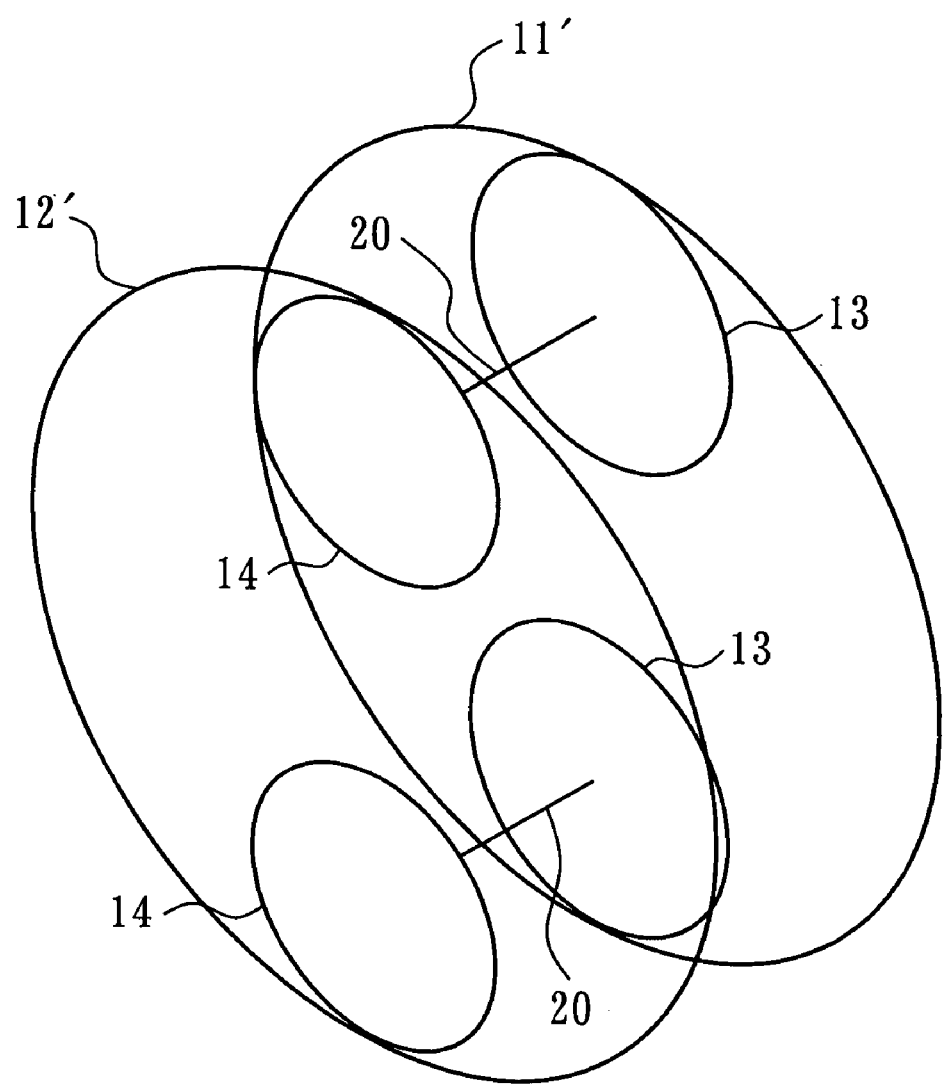
FIG. 12 is a diagram for explaining the configuration of the rotation transmission mechanism according to a third modified example of the present invention.

As shown by the rotation transmission mechanism 4 of the third modified example in FIG. 12, a first ring gear 11' substituting for the first sun gear 11 can engage with the first planetary gear 13 with the internal gear teeth and rotate together with the first shaft 3 coaxially, and a second ring gear 12' substituting for the second sun gear 12 can engage with the second planetary gear 14 with the internal gear teeth and rotate together with the second shaft 5 coaxially.

Figure 13:
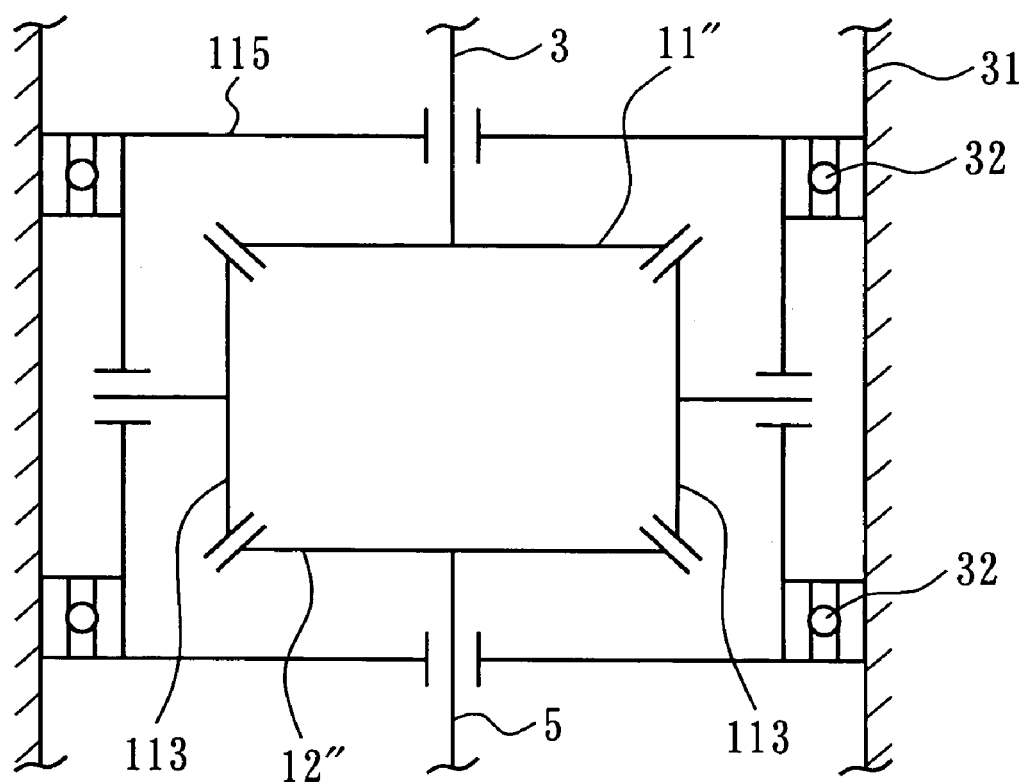
FIG. 13 is a diagram for explaining the configuration of the rotation transmission mechanism according to a fourth modified example of the present invention.

As shown by the rotation transmission mechanism 4 of the fourth modified example in FIG. 13, a first bevel gear 11"

substituting for the first sun gear 11 can rotate together with the first shaft 3 coaxially, a second bevel gear 12" substituting for the second sun gear 12 can rotate together with the second shaft 5 coaxially, and a pair of planetary bevel gears 113 substituting for the planetary gears 13, 14 can be rotatably supported around an axis orthogonal to the axis of both bevel gears 11", 12" by the carrier 115.

Further, since the rotation transmission mechanism merely needs to make the rotation transmission ratio between the first shaft and the second shaft variable, for instance, a harmonic drive can be adopted. The present invention can be applied to an electric power steering apparatus or a hydraulic power steering apparatus, wherein the second actuator 62 can be controlled based on the operating torque Th detected by the torque sensor 67 or the operating angle θh detected by the operating angle sensor 66 so as to add additional steering assist power so that the present invention can be applied to full-size vehicles. Or, by making the second actuator 62 also serve as the actuator for generating steering assist power, improvement of mounting performance and reduction of costs can be intended. The base value of the target value of the additional torque is not limited to zero, the value merely has to be a value capable of changing the operating torque in correlation with the amount of operation from the straight-ahead position of the operating member, when it is not necessary to change the rotation transmission ratio by the rotation transmission mechanism from the steady preset value. There is no particular limitation on the judgment standard for judging the necessity of changing the rotation transmission ratio by the rotation transmission mechanism from the steady preset value, for instance, whether the vehicle speed is zero or below a certain speed can be the judgment standard, and judgment that it is necessary to change the rotation transmission ratio when the vehicle speed is zero or below a certain speed can be performed. As a result, the change of the steering angle of the vehicle wheels based on the operation of the operating member when the vehicle is parked or running at a slow speed can be increased so as to improve the turning performance of the vehicle.

What is claimed is:

1. A vehicle steering apparatus, comprising:
   a first shaft connected to an operating member;
   a second shaft connected to vehicle wheels such that the steering angle changes according to the rotation thereof;
   a rotation transmission mechanism for connecting said first shaft with said second shaft via a plurality of rotation transmission elements so as to enable the rotation to be transmitted and enable the rotation transmission ratio between said first shaft and said second shaft to be changed;
   an actuator for rotatably driving one of said rotation transmission elements;
   a rotation speed determination part for determining the rotation speed of said first shaft; and
   a control device having a steady control mode in which said actuator is controlled so that the rotation speed of one of said rotation transmission elements becomes equal to the determined rotation speed of said first shaft;
   wherein said rotation transmission ratio becomes 1 when the rotation speed of one of said rotation transmission elements becomes equal to the rotation speed of said first shaft.

2. The vehicle steering apparatus according to claim 1, wherein said rotation transmission mechanism has a first sun gear which rotates together with said first shaft coaxially, a second sun gear which rotates together with said second shaft coaxially and is disposed coaxially with said first sun gear, a first planetary gear which engages with said first sun gear and has an axis parallel to said first sun gear, a second planetary gear which engages with said second sun gear and rotates together with said first planetary gear coaxially, and a carrier for rotatably supporting both said sun gears and both said planetary gears around their respective axes as the rotation transmission elements,
   wherein the rotation speed of said carrier becomes equal to the rotation speed of said first shaft in said steady control mode.

* * * * *